United States Patent [19]
Taborn et al.

[11] Patent Number: 5,646,875
[45] Date of Patent: Jul. 8, 1997

[54] DENORMALIZATION SYSTEM AND METHOD OF OPERATION

[75] Inventors: Michael Preston Taborn; Steven Michael Burchfiel; David Terrence Matheny, all of Austin, Tex.

[73] Assignee: International Business Machines Corporation, Armonk, N.Y.

[21] Appl. No.: 394,854

[22] Filed: Feb. 27, 1995

[51] Int. Cl.$^6$ ................................................. G06F 7/38
[52] U.S. Cl. ............................. 364/748.14; 364/715.04
[58] Field of Search ........................... 364/748, 715.04

[56] References Cited

U.S. PATENT DOCUMENTS

| | | | |
|---|---|---|---|
| 4,325,120 | 4/1982 | Colley et al. | 364/200 |
| 4,562,553 | 12/1985 | Mattedi et al. | 364/745 |
| 4,777,613 | 10/1988 | Shahan et al. | 364/748 |
| 4,780,842 | 10/1988 | Morton et al. | 364/748 |
| 4,852,039 | 7/1989 | Maheshwari et al. | 364/748 |
| 5,027,308 | 6/1991 | Sit et al. | 364/748 |
| 5,053,631 | 10/1991 | Perlman et al. | 364/748 |
| 5,058,048 | 10/1991 | Gupta et al. | 364/748 |
| 5,095,458 | 3/1992 | Lynch et al. | 364/787 |
| 5,103,418 | 4/1992 | Birger | 364/748 |
| 5,187,678 | 2/1993 | Hori | 364/748 |
| 5,237,667 | 8/1993 | Murakami et al. | 395/375 |
| 5,267,186 | 11/1993 | Gupta et al. | 364/748 |
| 5,272,660 | 12/1993 | Rossbach | 364/748 |
| 5,303,175 | 4/1994 | Suzuki | 364/748 |
| 5,408,427 | 4/1995 | Einaj et al. | 364/748 |

OTHER PUBLICATIONS

IBM Technical Disclosure Bulletin vol. 37 No. 4B Apr. 1994 Single Cycle/Writeback Floating Point Denorm . . . pp. 315–318.
IBM Technical Disclosure Bulletin vol. 36 No. 12 Dec. 1993 Selective Prenormalization of operands . . . pp. 693–695.
IBM Technical Disclosure Bulletin vol. 36 No. 6B Jun. 1993 Normalizing Three Divide Operands in one cycle pp. 165–166.
IBM Technical Disclosure Bulletin vol. 36 No. 3 Mar. 1993 Hardware Instruction Generation pp. 269–272.
IBM Technical Disclosure Bulletin vol. 35 No. 4A Sep. 1992 Early Exception Detection . . . pp. 135–136.
IBM Technical Disclosure Bulletin vol. 35 No. 1B Jun. 1992 Shift Count Adjustment Logic pp. 166–167.
IBM Technical Disclosure Bulletin vol. 33 No. 9 Feb. 1991 Floating Point Exception Handling . . . Denormalization pp. 345–348.
IBM Technical Disclosure Bulletin vol. 32 No. 4A Sep. 1989 Single hex/binary Floating Point Unit pp. 243–249.
IBM Technical Disclosure Bulletin vol. 32 No. 3A Aug. 1989 Easy Biased Exponent Handling via 2's complement . . . pp. 325–329.

(List continued on next page.)

*Primary Examiner*—David H. Malzahn
*Attorney, Agent, or Firm*—Michael A. Davis; Karl O. Hesse

[57] ABSTRACT

A system and method for denormalizing a floating point result is disclosed. Denormalized operands are capable of representing much smaller values than can be represented by a number normalized under the ANSI/IEEE standard 754-1985 that governs the representation of numbers in floating point notation to ensure uniformity among floating point notation users. The majority of results will be normalized operands and therefore the floating point unit pipeline is optimized to produce normalized results but contains wider exponent fields in order to represent values received as denormalized numbers. In order to return the result as a denormalized number with the smaller ANSI/IEEE exponent field, denormalization is accomplished by using the same pipeline resources by means of the floating point unit feedback path and uses one of the exponent equalizing alignment shifters and an incrementor in order to round the denormalized result. In this way, denormalized results can be provided without stopping the dispatching of instructions, without providing status bits in the register files and rename registers and without the hold signals often present in other floating point units to accomplish denormalization.

2 Claims, 2 Drawing Sheets

OTHER PUBLICATIONS

IBM Technical Disclosure Bulletin vol. 31 No. 6 Nov. 1988 Floating Point Unit Parallel Structure pp. 107–116.

IBM Technical Disclosure Bulletin vol. 31 No. 3 Aug. 1988 Implementation of Binary Floating Point Arch . . . pp. 4–9.

IBM Technical Disclosure Bulletin vol. 30 No. 9 Feb. 1988 Parallel Structure For High Performance Floating . . . pp. 411–414.

IBM Technical Disclosure Bulletin vol. 25 No. 10 Mar. 1983 Common Add, Subtract, Compare Algorithm . . . pp. 5212–5217.

DENORMALIZATION SYSTEM AND METHOD OF OPERATION

TECHNICAL FIELD

This invention relates in general to systems for processing information and in particular to floating point units for processing arithmetic information of several formats without the need for status or marker bits.

RELATED APPLICATIONS

This invention is related to inventions described in Ser. Nos. 08/394,868, filed Feb. 27, 1995, 08/315,741, filed Sep. 30, 1994, 08/323,476, filed Oct. 14, 1994, 08/323,485, filed Oct. 14, 1994 and 08/323,484, filed Oct. 14, 1994.

BACKGROUND OF THE INVENTION

Floating point units perform various arithmetic operations such as addition, subtraction, multiplication, division, square root on numerical operands represented in floating point notation. Floating point notation utilizes the format of a sign, a mantissa, and an exponent to represent a number. A floating point unit ascertains the sign, mantissa, and exponent for any input floating point number by decoding bit positions and then determining the sign, the numeric value of the mantissa, and the magnitude of the exponent from the decoded bits representing the floating point number.

The IEEE promulgates standards (specifically the ANSI/IEEE 754-1985) that govern the representation of numbers in floating point notation to ensure uniformity among floating point notation users. The IEEE standards include extended, double, and single precision formats as well as a special case called denormalized format. These formats determine the quantity of significant figures or size of the bit field for any number represented in floating point notation. For example, a double precision format defines 64 bits for operands with one bit representing the sign, eleven bits representing the magnitude of the exponent, and 52 bits representing the numeric value of the mantissa. Alternatively, a single precision format defines 32 bits for operands with one bit representing the sign, 8 bits representing the magnitude of the exponent, and 23 bits representing the numeric value of the mantissa.

Under IEEE formats having a normalized mantissa, floating point numbers rarely have equal exponents. Accordingly, when floating point units add or subtract a second operand represented in floating point notation to a first operand represented in floating point notation, the mantissa of the second operand typically must be shifted because an addition or subtraction cannot be performed until the exponent of the second operand equals the exponent of the first operand. The floating point units equalize the first and second exponents by shifting the mantissa of the second operand relative to the mantissa of the first operand. Shifting the second mantissa to the right increases its exponent one for each shift, while shifting the second mantissa to the left decreases its exponent one for each shift.

Floating point units typically include a comparator and alignment shifter for shifting the second mantissa such that the second exponent equals the first exponent. The comparator compares the values of the first and second exponents to determine the number of shifts the second mantissa requires to equalize the first and second exponents.

The alignment shifter includes a bit field greater than the bit field for the first mantissa in order to accommodate any bits of the second mantissa not aligned with the bits of the first mantissa. The first and second mantissas will not align whenever there exists a difference in magnitude between the first and second exponent. Specifically, if the second exponent exceeds the first exponent, at least one bit of the second mantissa will reside within the alignment shifter in a bit positions left of the most significant bit of the first mantissa (hereinafter referred to as second path bits). Conversely, if the second exponent is less than the first exponent, at least one bit of the second mantissa will reside in bit positions to the right of the least significant bit of the first mantissa (hereinafter referred to as sticky bits).

Floating point units include an adder that performs the desired operation (i.e., addition or subtraction) on the first mantissa and any bits of the second mantissa residing in bit positions aligned with the bits of the first mantissa to produce an intermediate result. The output from the adder forms an intermediate result because the final result of the operation must be modified if the shifting of the second mantissa created second path bits. If second path bits exist, the intermediate result must be modified by placing the least significant bit of the second path bits in the bit position to the left of the most significant bit of the intermediate result so that the final result reflects all the bits of the second mantissa.

Floating point units include a normalize shifter that normalizes the final result by shifting the leading one of the final result until it resides to the left of the most significant bit of the normalize shifter. However, before the normalize shifter can normalize the final result, a normalize shift value must be calculated from the position of the leading one within the second path bits. Consequently, floating point units include a leading ones detector (LOD) that inputs the second path bits, determines the position of the leading one, and calculates the normalize shift value required to control the normalize shifter.

Floating point units include an adjust circuit that will supply the final sign, exponent and mantissa required for IEEE correct results.

If the first exponent exceeds the second exponent, sticky bits rather than second path bits exist. Consequently, the intermediate result output from the adder does not require modification and, thus, forms the final result. A leading ones detector (LOD) similar to the LOD described above determines the leading one within the intermediate result and calculates a normalize shift value accordingly. Normalize shifter normalizes the unmodified final result and then outputs a normalized final result to the adjust circuit. The adjust circuit rounds off the final result utilizing the sticky bits.

One present floating point processing system includes a multiple stage processing pipeline for executing instructions, and circuitry within the pipeline for detecting the magnitude of the result. When the result is such that it can be represented in the fields described above for normalized numbers, the result is made available for storage or further processing. When the value of the result is so small that the exponent portion of the normalized result would be less than hex001, order of magnitude information will be lost when the result is stored into a memory organized according to the fields described above. Therefore the exponent must somehow be adjusted to avoid losing the information.

In one known floating point processing system, the registers surrounding the floating point unit have extended exponent field bit storage as well as a marker bit to indicate that the result stored in the register is not the standard denormalized format but is too small to be stored in the normalized format. The marked result is then available for processing by a subsequent instruction by being sent back through hardware to convert the result to denormalized format before making it available for storage in memory. Extra bits in the registers require that the random test pattern generator used for error detection and correction also allow for these extra bit positions. Further, the design of surrounding elements of the processor must take the marker bits into account an therefore the complication caused by the marker bit approach multiplies.

In another floating point processing system according to the IEEE standard, a small number is detected as an underflow exception and trapped for handling by software. The trap handler adjusts the exponent bias by a fixed constant as described in section 7.4 of ANSI/IEEE standard 754-1985 so that order of magnitude information is not lost during the interval that the result must be stored into a register that has an exponent field too small to contain the exponent accurately in normalized format. A program routine that usually exceeds twenty instructions then must split the exponent and mantissa into two integers and operate on them to convert the biased trapped result into the standard denormalized format.

SUMMARY OF THE INVENTION

In a first aspect of the invention, checking logic determines, in the same clock cycles as result data is being calculated, whether the value of the result is large enough to be represented in normalized form without loss of order of magnitude information.

In a second aspect of the invention, very small valued double precision result data is detected and fed back into the first stage of the multiple stage processing pipeline for conversion into denormalized format while the executing instruction is delayed for a few cycles before an operation finished signal is sent to the dispatch unit and the fully denormalized result is stored into a register.

In a third aspect of the invention, detection of very small single precision result data is accomplished while the result is being calculated and the result is fed back into the first stage of the multiple stage pipeline for conversion into denormalized format and is then further converted into double precision format in order to avoid the need to carry an indicator or status bit with the result into register storage.

It is a technical advantage of the present invention that result data is converted into denormalized format without the need for cancelling scheduled instructions and scheduling denormalize instructions into the pipeline and without the need for adding additional hardware circuits and/or marker bit fields to the floating point unit.

DETAILED DESCRIPTION OF A PREFERRED EMBODIMENT

Figure 1:
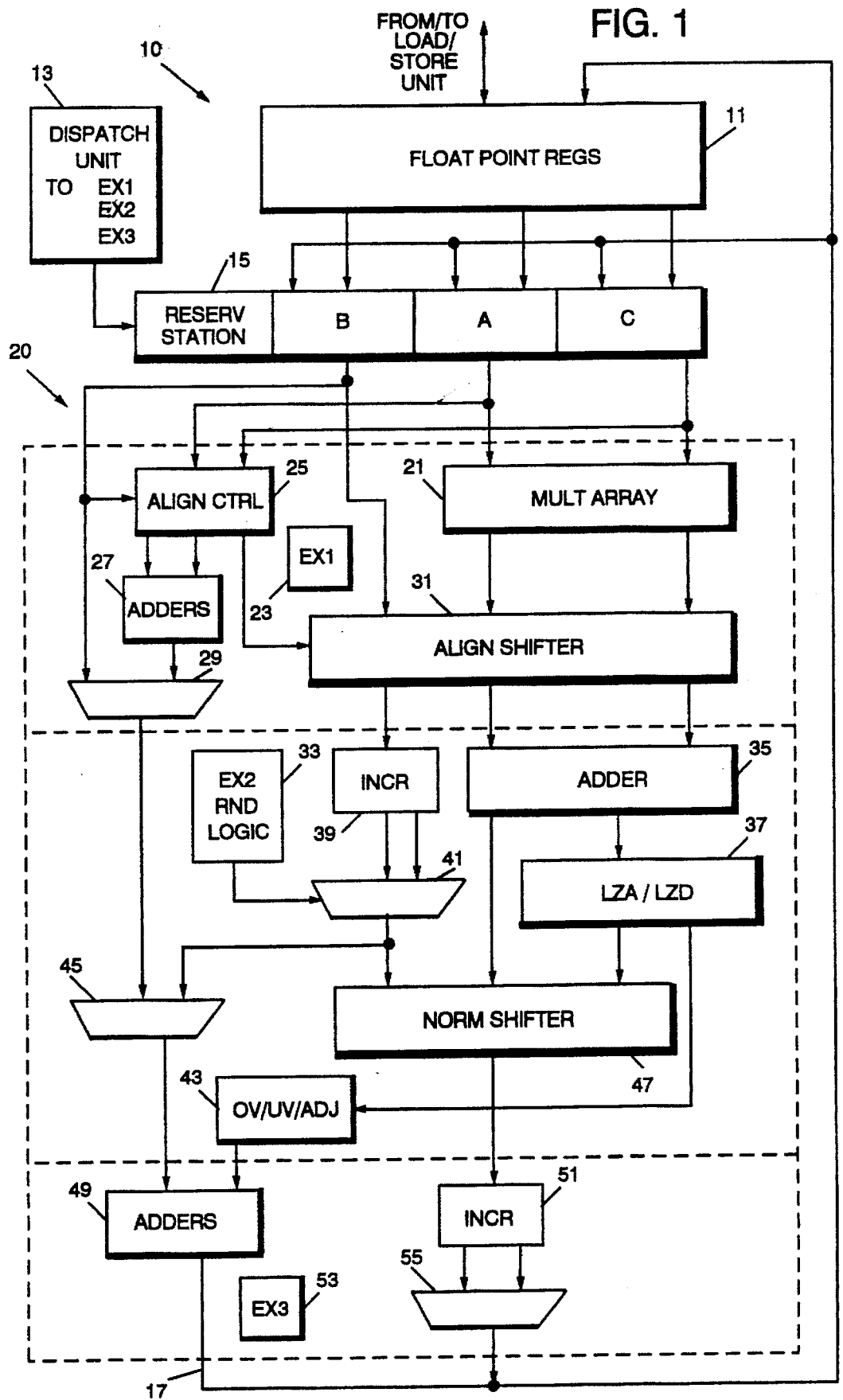
FIG. 1 is a block diagram of a floating point unit of a system showing where the method of the present invention is carried out.
Figure 2:
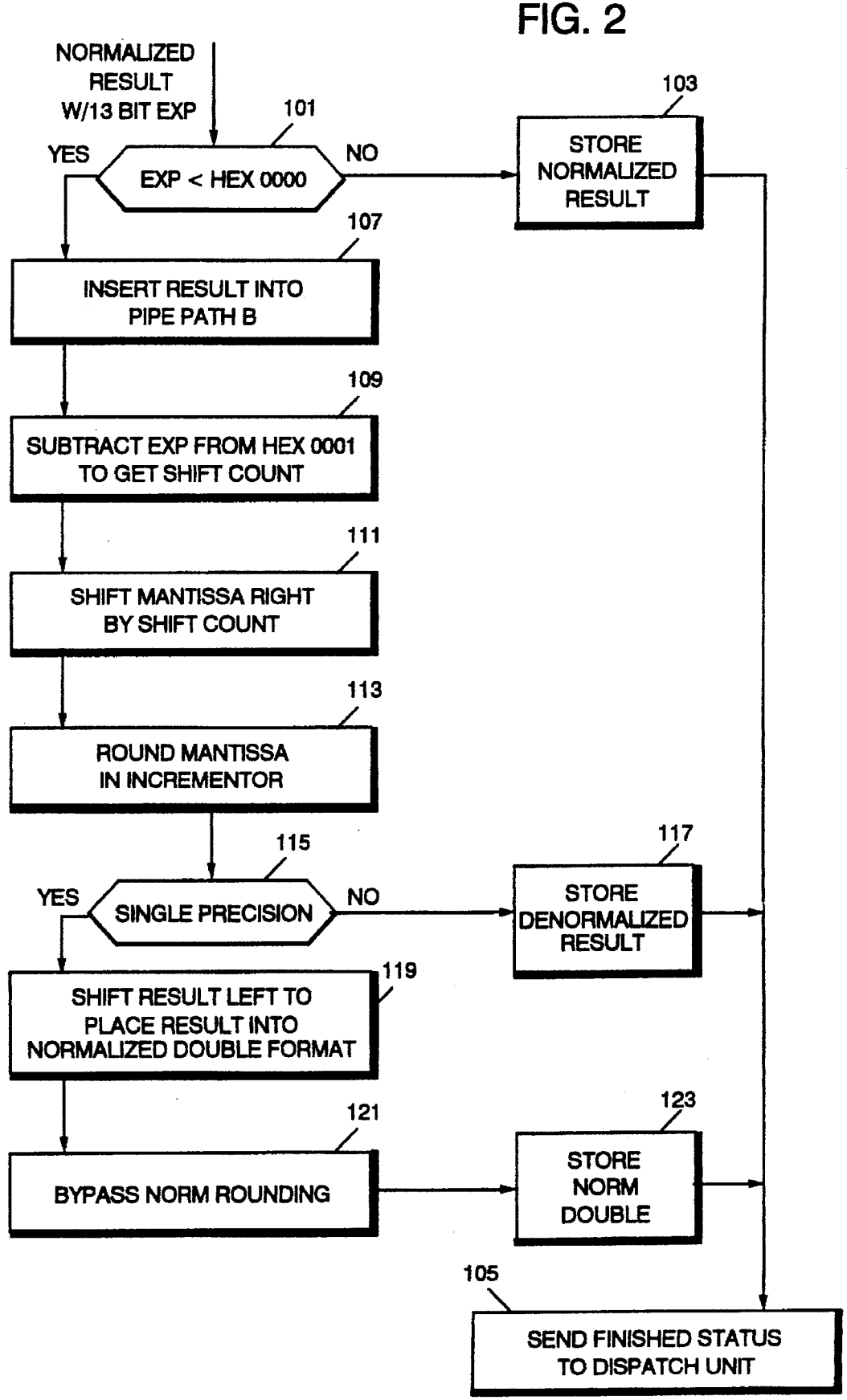
FIG. 2 is a flow diagram of the method of the present invention.

An illustrative embodiment of the present invention and its advantages is better understood by referring to FIGS. 1 and 2 of the drawings.

FIG. 1 is a block diagram of the floating point unit and the adjacent dispatch unit according to the preferred embodiment. In the preferred embodiment, the processor containing the floating point unit is a single integrated circuit superscalar microprocessor. The processor includes various units, registers, buffers, memories, and other sections, all of which are formed by integrated circuitry. Also, in the preferred embodiment, the processor operates according to reduced instruction set computing ("RISC") techniques. A system bus is connected to a memory and to a bus interface unit. The bus interface unit controls the transfer of information between the processor and the memory and other system parts such as I/O adapters.

The bus interface unit connects the memory to an instruction cache and to a data cache. The instruction cache outputs instructions to an instruction flow unit from which they are dispatched to the various execution units of the processor, an example being the floating point unit. The floating point unit receives its source operand information from floating point registers 11, and the load store unit. The floating point unit outputs its result information from its operations for storage at selected entries in the floating point registers 11 or in other storage such as rename buffers known in the prior art.

In response to a Load instruction, the load store unit inputs information from the data cache and copies such information to selected ones of the registers 11 and or the floating point unit 10. If such information is not stored in the data cache, then such information is obtained from a system memory connected to the system bus. Likewise, the data cache is able to output information from the data cache to system memory.

The system achieves high performance by processing multiple instructions simultaneously in various execution units. Accordingly, each instruction is processed as a sequence of stages, each being executable in parallel with stages of other instructions. Such a technique is called "pipelining". In a significant aspect of the preferred embodiment, an instruction is normally processed in stages, namely fetch, decode, dispatch, execute, and completion.

In the fetch stage, the instruction flow unit 13 selectively inputs one or more instructions from one or more memory addresses storing the sequence of instructions. In the decode stage, the instruction flow unit 13 decodes up to four fetched instructions.

In the dispatch stage, the instruction flow unit 13 selectively dispatches up to four decoded instructions to selected execution units after reserving a register for each dispatched instruction's result. In the dispatch stage, operand information is supplied to the selected execution units for dispatched instructions.

In the execute stage, execution units such as the floating point unit 10, execute their dispatched instructions for example in three stage execution pipeline 20 and output results of their operations for storage at selected entries in registers 11. In this manner, the system is able to execute instructions out-of-order relative to their programmed sequence.

In the completion stage, the execution unit indicates an instruction is "complete" by sending finished status to the dispatch unit 13.

In the preferred embodiment, floating point unit 10 includes sets of reservation stations 15, any number being included in alternative embodiments. In normal operation, each of reservation stations 15 receives and stores an instruction and its associated register target addresses (i.e. the addresses of the instruction's specified registers in registers 11) from the instruction flow unit 13. Moreover, reservation stations 15 receive and store operands (associated with the instructions stored in reservation stations 15) from a number of sources including the registers and cache and memory.

While instruction flow unit 13 dispatches an instruction, if one or more of the instruction's operands is not validly available from one of the operand suppliers, then the instruction has an unresolved dependency on another instruction's result. If an instruction has such an unresolved dependency, the processor resolves the dependency after each unavailable operand later becomes validly available.

At a suitable moment when pipeline 20 is available to process an instruction, a reservation station is selected. The selected reservation station outputs ("launches") its stored instruction, associated operands, and associated register target address into execution pipeline 20.

Floating point unit 10 processes a successfully launched instruction through each stage of pipeline 20. After the instruction is processed through the last stage of pipeline 20, pipeline 20 outputs a result of the instruction on result bus 17 and 30 stores the result into one of registers 11 selected in response to the instruction's associated target address.

Floating point unit 10 processes information in response to several different types of instructions including a floating point multiply add a*c+b; where a=operand A, b=operand B, c=operand C, "*" denotes a multiply operation and "+" denotes an addition operation. In the preferred embodiment, pipeline 20 operates according to the IEEE standard for binary floating point arithmetic STD 754-1985 and includes a fused multiply-add array 21 for performing the arithmetic operation b+a*c.

Floating point unit 10 is able to finish processing any of the usual types of instructions during a single pass through pipeline 20. The floating point unit 10 finishes processing an instruction (which has been dispatched from instruction flow unit 13) when the floating point unit stores the instruction's result from result bus 17 into a selected one of registers 11.

Further, floating point unit 10 processes information in response to a divide and a square-root type of instruction. The divide and square-root instructions are classified as iterative instructions because floating point unit 10 finishes processing such an instruction during multiple iterative passes through pipeline 20. In this manner, the hardware circuitry of floating point unit is streamlined, because dedicated circuitry is not used to execute an iterative instruction.

In order to control execution of an iterative instruction by floating point unit 10, a sequencer selectively outputs a sequence of instructions and target addresses to pipeline 20. These target addresses from the sequencer include target addresses of assigned ones of temporary registers for storing intermediate results generated during an iterative instruction execution by pipeline 20.

During execution of the iterative instruction, floating point unit 10 convergently generates a result by executing the sequence of instructions from the sequencer by processing the sequence of instructions through pipeline 20. Some of these instructions have data dependencies upon results of earlier instructions in the sequence. The denormalizing method of this invention does not require the use of temporary registers or a sequence of instructions as do the execution steps of an iterative instruction.

Referring again to FIG. 1, in addition to the multiply array 21, the first stage of pipeline 20 also includes EX1 execution control circuits 23 which control the multiply array and the other circuits of the first stage in accordance with the instruction being executed. Some of the other circuits of stage one include the align control, adders 27 and mux 29 which operate upon the exponent portion of the operands. The align control 25 controls the align shifter 31 to shift the mantissa of the second operand so that the exponent is equal to the first operand to allow addition or subtraction. The adders 27 are used during execution of multiply instructions to add the exponents of the operands. Mux 29 determines whether the sum of the exponents or the first or B exponent will be passed to the next stage of pipeline 20.

As will be explained in more detail later with respect to the flow diagram of FIG. 2, the align control 25 and align shifter 31 are used in the method of the invention to denormalize a result that is too small for accurate representation in normalized format.

Referring again to FIG. 1, EX2 execution control circuits control the circuits of stage two. The circuits of stage two comprise adder 35, left zero anticipate and detect 37, incrementor 39, mux 41 and normalization shifter 47, all for operating on the mantissa portion of the operands. EX2 33 receives input from the left zero circuits to control mux 41 for rounding. Mux 45 passes the exponent to the adders 49 of the third pipeline stage.

In the third stage, another set EX3 of execution control circuits 53 handle the normalizing functions usually performed in this stage as well as controlling mantissa incrementor 51 and mux 55. The exponent output from adders 49 and the mantissa output of mux 55 are combined onto the result bus 17 which is connected back to the reservation station 15 and to the floating point registers 11.

The above described floating point unit is exemplary of the type of unit that can be controlled in accord with this invention as set out with respect to FIG. 2 in order to denormalize small result values without the complexity and overhead of the prior art.

OPERATION OF THE PREFERRED
EMBODIMENT

Referring now to FIG. 2, a flow diagram of the method of the invention is set out. At block 101, a normalized result from pipeline 20 is tested by the EX3 circuits in the first half of the last stage. If the 13 bit exponent portion of the result is more than hex 0000, then the result can be stored accurately using an eleven bit exponent and therefore the result is stored at block into a floating point register and finished status is sent at block 105 to the dispatch unit 13 of FIG. 1.

If instead, the 13 bit exponent portion of the result is found at block 101 to be less than or equal to hex 0000, then the result can not be represented in a normalized format having an eleven bit exponent field without losing order of magnitude information. Therefore the result is not stored to registers but is reinserted into path B of the first stage of the pipeline 20 at block 107.

At block 109, the exponent of the result is subtracted from one, that is a hex 0001, in align control 25 to obtain an absolute value which is used as the shift count value. At block 111, the mantissa is shifted right in the align shifter 31 to reduce its order of magnitude by the amount that will allow the minimum exponent to be combined with the shifted result mantissa to accurately represent the result.

Continuing in FIG. 2, the mantissa is rounded in block 113 by control of EX2 circuits to minimize the loss of accuracy of the mantissa by right shifting.

In EX3 circuits 53, it is determined at block 115 whether the result is single precision. If it is double precision, denormalized result is passed through stage three without change and stored to a floating point register with an exponent of zero. Finished status is then sent at block 135 to permit execution of the next sequentially launched instruction.

If at block 115, the result is found to be single precision, the second stage EX2 block 33 circuits control the normalize shifter 47 to shift the result to the left to convert the single precision denormalized result into a double precision format for storage into a floating point register. If it is to be stored into system memory, it is reconverted to single precision format before being stored out to system memory. After shifting left, to place the result into normalized double precision format, the rounding circuits of stage three are inhibited at block 121 before storing the normal format double word to floating point registers at block 123 and sending finished status at block 105.

Although an illustrative embodiment of the present invention and its advantages have been described in detail hereinabove, they have been described as examples and not as limitations. Various changes, substitutions and alterations can be made in the illustrative embodiments without departing from the breadth, scope and spirit of the present invention. The breadth, scope and spirit of the present invention should not be limited by the illustrative embodiments, but should be defined only in accordance with the following claims and equivalents thereof.

What is claimed is:

1. Method of denormalizing a result comprising the steps of:

identifying in a pipelined unit, a normalized result having a biased exponent less than zero;

inserting said identified result into said pipelined unit without indicating to an instruction flow control that execution of an executing instruction is finished;

shifting a mantissa of said result in said pipelined unit an amount so that a denormalized number formed from said shifted mantissa combined with a biased exponent of zero represents a value substantially equal to said result;

identifying said denormalized number as single precision;

shifting said denormalized number left to place said denormalized number on a double word boundary;

bypassing rounding circuits of said pipelined unit that would otherwise round said shifted denormalized number; and indicating to an instruction flow control that execution of said executing instruction is finished.

2. Method of denormalizing a result comprising the steps of:

Identifying in a pipelined unit, a normalized result having a biased exponent less than zero;

inserting said identified result info said pipelined unit without indicating to an instruction flow control that execution of an executing instruction is finished;

subtracting an exponent of said result from one to obtain an absolute value;

shifting a mantissa of said result to the right by a count equal to said absolute value so that a denormalized number formed from said shifted mantissa combined with a biased exponent of zero represents a value substantially equal to said result;

identifying said denormalized number as a double precision number;

bypassing shifting of said denormalized number for placing a single precision denormalized number on a double precision boundary; and indicating to an instruction flow control that execution of said executing instruction is finished.

* * * * *